US010830924B2

(12) United States Patent
Theoden et al.

(10) Patent No.: US 10,830,924 B2
(45) Date of Patent: Nov. 10, 2020

(54) OPTICAL ARTICLE COMPRISING A PRECURSOR COATING OF AN ANTI-FOGGING COATING HAVING ANTI-FOULING PROPERTIES OBTAINED FROM AN AMPHIPHILIC COMPOUND

(71) Applicant: ESSILOR INTERNATIONAL, Charenton-le-Pont (FR)

(72) Inventors: Alexis Theoden, Charenton-le-Pont (FR); Mamonjy Cadet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 382 days.

(21) Appl. No.: 15/768,156

(22) PCT Filed: Oct. 13, 2016

(86) PCT No.: PCT/FR2016/052653
§ 371 (c)(1),
(2) Date: Apr. 13, 2018

(87) PCT Pub. No.: WO2017/064431
PCT Pub. Date: Apr. 20, 2017

(65) Prior Publication Data
US 2019/0025471 A1  Jan. 24, 2019

(30) Foreign Application Priority Data
Oct. 14, 2015 (FR) ...................................... 15 59756

(51) Int. Cl.
| G02B 1/14 | (2015.01) |
| C07F 7/18 | (2006.01) |
| G02B 27/00 | (2006.01) |
| G02B 1/18 | (2015.01) |
| C08L 71/02 | (2006.01) |

(52) U.S. Cl.
CPC .............. *G02B 1/14* (2015.01); *C07F 7/1804* (2013.01); *C08L 71/02* (2013.01); *G02B 1/18* (2015.01); *G02B 27/0006* (2013.01)

(58) Field of Classification Search
CPC ........ G02B 1/14; G02B 1/18; G02B 27/0006; G07F 7/1804
USPC .............................. 359/507, 509; 315/159.33
See application file for complete search history.

(56) References Cited

U.S. PATENT DOCUMENTS

| 3,477,901 A | 12/1969 | Keil |
| 3,817,739 A | 6/1974 | Walters et al. |
| 6,183,872 B1 | 2/2001 | Tanaka et al. |
| 6,312,131 B1 * | 11/2001 | Yamamoto ................ B60R 1/08 |
| | | 359/507 |
| 6,816,297 B1 * | 11/2004 | Tonar ........................ G02B 1/14 |
| | | 359/265 |
| 8,709,588 B2 * | 4/2014 | Cadet ....................... G02B 1/111 |
| | | 428/304.4 |
| 9,637,643 B2 * | 5/2017 | Fournand ........... G02B 27/0006 |
| 2006/0158735 A1 * | 7/2006 | Tonar ...................... B60R 1/088 |
| | | 359/507 |
| 2009/0053465 A1 * | 2/2009 | Scherg ...................... G02B 1/18 |
| | | 428/137 |
| 2010/0033819 A1 * | 2/2010 | Schulz .................... G02B 1/105 |
| | | 359/507 |
| 2013/0308159 A1 | 11/2013 | Yoshimura et al. |
| 2013/0308189 A1 | 11/2013 | Gloege et al. |
| 2014/0177053 A1 * | 6/2014 | Cadet ................. G02B 27/0006 |
| | | 359/507 |

FOREIGN PATENT DOCUMENTS

| EP | 1324078 | 7/2003 |
| GB | 1386876 | 3/1975 |
| JP | 2004/317539 | 11/2004 |
| JP | 2005/187936 | 7/2005 |
| JP | 2005/281143 | 10/2005 |
| WO | WO 2006/049020 | 5/2006 |
| WO | WO 2008/062142 | 5/2008 |
| WO | WO 2010/109154 | 9/2010 |
| WO | WO 2011/080472 | 7/2011 |
| WO | WO 2012/153072 | 11/2012 |
| WO | WO 2013/013929 | 1/2013 |
| WO | WO 2014/102298 | 7/2014 |
| WO | WO 2014/111513 | 7/2014 |
| WO | WO 2013/005710 | 2/2015 |
| WO | WO 2015/082521 | 6/2015 |

OTHER PUBLICATIONS

International Search Report Issued in Corresponding PCT Application No. PCT/FR2016/052653, dated Jan. 12, 2017.
Iyanagi, et al., "Cosmetics Containing Fluorinated Ladder Polysiloxanes," XP002759125, Database CA, Chemical Abstracts Service, retrieved from STN Database Accession No. 1997: 732311.
Iyanagi, et al., "Fluorine-Containing Ladder Polysiloxanes Forming Flexible Tough Water and Oil-Repellent Films on Various Substrates for Cosmetics, Etc. and Manufacture Thereof," XP002759126, Database CA Chemical Abstracts Services, retrieved from STN Database Accession No. 1997-425024.

(Continued)

Primary Examiner — Ricky D Shafer
(74) Attorney, Agent, or Firm — Norton Rose Fulbright US LLP

(57) ABSTRACT

The present invention relates to an organosilane compound having at least one silicon atom bearing at least one hydrolysable group, at least one non-hydrolysable group comprising a hydrophilic group, and at least one non-hydrolysable group comprising a hydrophobic group having at least one fluorine atom, said hydrophilic group and said hydrophobic group not both comprising, in the main chain, the same substituent of the silicon atom. The invention further relates to an optical article having a substrate coated with a precursor coating of an anti-fogging coating formed by depositing said organosilane compound on the surface of the optical article. The precursor of the anti-fogging coating, which also has anti-fouling properties, is converted into the actual anti-fogging coating by application of a surfactant film to the surface thereof.

17 Claims, No Drawings

(56) References Cited

OTHER PUBLICATIONS

Suzuki, et al., "Synthesis and Water Resistance of Novel Bisfunctional Silane Coupling Agents with a Double Bonded Group and a Poly(fluoro)alkyl Group," XP002759124, Database CA, Chemical Abstracts Service, retrieved from STN Database Accession No. 2009:467770.

* cited by examiner

OPTICAL ARTICLE COMPRISING A PRECURSOR COATING OF AN ANTI-FOGGING COATING HAVING ANTI-FOULING PROPERTIES OBTAINED FROM AN AMPHIPHILIC COMPOUND

CROSS-REFERENCE TO RELATED APPLICATIONS

This application is a national phase application under 35 U.S.C. § 371 of International Application No. PCT/FR2016/052653 filed 13 Oct. 2016, which claims priority to French Patent Application No. 1559756 filed 14 Oct. 2015. The entire contents of each the above—referenced disclosures is specifically incorporated by reference herein without disclaimer.

The present invention is concerned with obtaining an optical article, more particularly an ophthalmic lens, comprising a surface coating which has both anti-fouling properties and an effective and long-lasting anti-fog effect after application of a temporary anti-fog solution. The present invention relates to such a coated article, to the process for preparing same and to a family of organosilane in compounds which make it possible to prepare the surface coating in question.

Numerous supports, such as plastics and glass, exhibit the disadvantage of becoming covered with fogging when the temperature of their surface falls below the dew point of the ambient air. This is the case in particular with glass, which is used to form windows for transportation vehicles or buildings, mirrors, ophthalmic lenses, such as spectacle lenses, and the like. The formation of fogging on these surfaces leads to a decrease in the transparency, due to the scattering of light by the water drops, which can cause significant nuisance.

In order to prevent the formation of fogging in a very humid environment, that is to say the condensation of minute water droplets on a support, it is possible to deposit, on the outer surface of this support, hydrophilic coatings having a low static contact angle with water (typically 10° or less). These permanent anti-fog coatings, the hydrophilic properties of which result from hydrophilic compounds permanently bonded to another coating or support, act as sponges with regard to the fogging and make it possible for the water droplets to adhere to the surface of the support by forming a very thin film which gives a sense of transparency. As a result of the absorption of water, they expand, soften and become mechanically weaker.

Another solution consists in using a thin porous layer having a low refractive index, partially composed of surfactants, which allow the layer to acquire permanent anti-fog properties.

A more advantageous alternative to permanent anti-fog coatings consists in obtaining an anti-fog coating by application of a temporary hydrophilic solution to the surface of a precursor coating for an anti-fog coating.

A description has been given, in international patent applications WO 2011/080472, WO 2012/153072 and WO 2013/013929, of the deposition, on the outer surface of an optical article coated with a coating comprising silanol groups at its surface, of a precursor coating for an anti-fog coating obtained by grafting a compound having a polyoxyalkylene group, in particular an organosilane of formula $CH_3O-(CH_2CH_2O)_{6-9}-(CH_2)_3Si(OCH_3)_3$. This precursor coating for an anti-fog coating is hydrophilic since it has a static contact angle with water ranging from 10° to 50°. The actual anti-fog coating, which is a temporary coating, is obtained after application of a film of a surfactant composition to the surface of the precursor coating, directly in liquid form or by means of dry or wet wipes comprising said composition.

The precursors for anti-fog coatings described in these applications give access to anti-fog coatings that are very efficient, but do not have notable anti-fouling properties. Such coatings, also referred to as "hydrophobic and/or oleophobic coatings", are generally manufactured from fluorosilanes or fluorosilazanes, i.e. silanes or silazanes containing fluorine atoms, and do not naturally make it possible to impart anti-fog properties. Compounds that can be used to obtain such anti-fouling coatings are described in patents JP 2005-187936 and U.S. Pat. No. 6,183,872.

Japanese application JP 2004-317539 describes a lens coated with an antireflective coating and with a coating formed by depositing a compound comprising a fluorinated hydrophobic group, a hydrophilic group comprising a polyoxyethylene group and a group capable of reacting with the surface of the substrate. The organosilane compounds envisioned all have the fluorinated hydrophobic group and the polyoxyethylene hydrophilic group included in the main chain of one and the same substituent of the silicon atom, for example the compound of formula $C_8F_{17}O(CH_2CH_2O)_2CONH(CH_2)_3Si(OCH_3)_3$ in which these groups are attached. The coating thus formed has a contact angle with water that varies from 50° to 90° and gives access to an anti-fog coating after application of a surfactant to its surface.

Japanese application JP 2005/281143 describes other coatings for optical lenses based on non-fluorinated silanes having polyoxyethylene groups having contact angles with water of the order of 60-65°, which, once a surfactant is applied to the surface thereof, exhibit anti-fog properties.

Application US 2013/308189 describes an optical article comprising an anti-fog coating obtained by depositing a silane of formula $R_oX_mSiA_n$, wherein m=1-3, n=1-2 and o=0-1, X is a hydrolyzable group, R is a $C_1$-$C_4$ alkyl group, A is a group of structure -A1-A2, wherein -A1- is a hydrophobic group bonded to the silicon, and -A2 represents a poly(meth)acrylate hydrophilic end group bonded to A1. With such a structure, it is taught that the contact angle with water of the anti-fog coating is maintained at a low level.

International application WO 2006/049020 describes a composition that makes it possible to form, at the surface of an optical lens, an anti-fouling coating, comprising a first polymerizable silane which is fluorinated and a second polymerizable silane which has a hydrophilic group (especially an oxyalkylene group), and/or hydrolyzates of these silanes. These coatings have contact angles with water of the order of 100°.

International application WO 2013/005710 describes an optical article successively coated with a layer capable of absorbing water based on an acrylic or urethane resin having a polyoxyethylene chain and with a hydrophobic layer based on an amino-modified or mercapto-modified silane. The outer surface of the article thus has a contact angle with water of greater than or equal to 100°.

International application WO 2015/082521, in the name of the applicant, discloses an optical article that has a substrate coated with a precursor coating for an anti-fog coating, the surface of which has a static contact angle with water of greater than 90° and a polar component of the surface energy of greater than 1.5 mJ/m². Such a coating is typically obtained by successive deposits of a hydrophobic compound B and of a hydrophilic compound A, in particular an organosilane A comprising at least one polyoxyalkylene group and having at least one silicon atom bearing at least one hydrolyzable group and an organosilane B comprising at least one fluorocarbon group and having at least one silicon atom bearing at least one hydrolyzable group.

The coatings disclosed in these various applications either have anti-fouling properties that can be improved, or insufficient anti-fog properties that can be improved, or else require the successive application of several compounds in order to achieve the desired properties.

The present invention is directed toward the obtaining of an optical article comprising an outer coating that can exhibit both anti-fog and anti-fouling properties, for which the manufacturing process would be simplified compared with the known multi-step on multi-component processes.

The inventors have prepared a new family of molecules and developed a new method for preparing "mixed" surfaces, that is to say surfaces having both hydrophilic functions and hydrophobic functions, making it possible to alternatively benefit from anti-fog and anti-fouling properties, in particular a good capacity of the coating to be cleaned. According to the invention, the precursor coating for the anti-fog coating has the advantage of being able to be formed in a single step from a single compound, by depositing a molecule of which the structure comprises a hydrophobic block and a hydrophilic block which are specifically arranged, in other words an amphiphilic (hydrophilic-hydrophobic) compound.

The objectives of the invention are achieved by virtue of an organosilane compound having at least one silicon atom bearing at least one hydrolyzable group, at least one non-hydrolyzable group comprising a hydrophilic group, and at least one non-hydrolyzable group comprising a hydrophobic group having at least one fluorine atom, said hydrophilic group and said hydrophobic group not both being included in the main chain of one and the same substituent of the silicon atom.

The invention also relates to an optical article having a substrate coated with a precursor coating for an anti-fog coating, formed by depositing, at the surface of the optical article, at least one organosilane compound (this term including in particular organosilazanes) as described above, said precursor coating being optionally coated with a surfactant film.

In the present patent application, a coating which is "on" a substrate/coating or which has been deposited "on" a substrate/coating is defined as a coating which (i) is positioned above the substrate/coating, (ii) is not necessarily in contact with the substrate/coating, that is to say that one or more intermediate coatings may be positioned between the substrate/coating and the coating in question (however, it is preferably in contact with said substrate/coating), and (iii) does not necessarily completely cover the substrate/coating. When "a layer 1 is located under a layer 2", it will be understood that the layer 2 is further from the substrate than the layer 1.

The term "anti-fog coating" is intended to mean, in the present patent application, a coating which, when a transparent glass substrate coated with this coating is placed under conditions which bring about fogging on said substrate not equipped with said coating, immediately makes possible a visual acuity $>6/10^{th}$ for an observer observing, through the coated glass, a visual acuity chart located at a distance of 5 meters. A test which makes it possible to evaluate the anti-fog properties of a coating is described in the experimental section. Under conditions which bring about fogging, the anti-fog coatings may either not exhibit fogging at their surface (no visual distortion in the ideal case or else visual distortion but visual acuity $>6/10^{th}$ under the measurement conditions indicated above) or may exhibit fogging at their surface but all the same may make possible, despite the disturbance to vision caused by the fogging, a visual acuity $>6/10^{th}$ under the measurement conditions indicated above. A non-anti-fog coating does not make possible a visual acuity $>6/10^{th}$ while it is exposed to conditions bringing about fogging and generally exhibits a veil of condensation under the measurement conditions indicated above.

The term "anti-fog lens" is intended to mean, in the present patent application, a lens equipped with an "anti-fog coating" as defined above.

The term "precursor for an anti-fog coating" is intended to mean, in the present patent application, a coating which, by applying a composition containing a surfactant to its surface so as to form a film, constitutes an anti-fog coating within the meaning of the invention. The composition comprising a surfactant may be a liquid solution applied directly on an optical article, or a composition impregnating a wipe, this wipe possibly being wet or dry (absence of solvents), for example a CEMOI™ dry wipe impregnated with Capstone™ FS3100 such as that described in patent application WO 2013/013929.

The surfactants that make it possible to form an anti-fog film preferably comprise a fluorocarbon group and at least one polyoxyalkylene unit. The assembly formed by the precursor coating and the film of surfactant-based solution constitutes the actual anti-fog coating.

Thus, the precursor coating for the anti-fog coating according to the invention, which is a coating having an anti-fouling hydrophobic surface, is not regarded as being an anti-fog coating within the meaning of the invention, but can be easily converted into an anti-fog coating. In fact, this precursor for the anti-fog coating does not make possible a visual acuity $>6/10^{th}$ under the measurement conditions indicated above.

The term "temporary anti-fog coating" is intended to mean an anti-fog coating obtained after the application of a liquid solution containing at least one agent that imparts anti-fog properties, preferentially a surfactant, to the surface of a precursor coating for said anti-fog coating. The durability of a temporary anti-fog coating is generally limited by actions in which its surface is wiped, the surfactant molecules not being permanently attached to the surface of the coating, but simply adsorbed in a more or less lasting fashion.

The optical article prepared according to the invention comprises a substrate, preferably which is transparent (Tv greater than 85%, better still greater than 90%, even better still greater than 95% and optimally greater than 97%. The Tv factor corresponds to a standardized international definition (ISO 13666:1998 standard and is measured in accordance with the ISO 8980-3 standard). It is defined in the wavelength range extending from 380 to 780 nm), having front and back main faces, at least one of said main faces, preferably both main faces, comprising at least one precursor coating for an anti-fog coating. The "back face" of the substrate (the back face generally being concave) is intended to mean the face which, when the article is being used, is closest to the eye of the wearer. Conversely, the "front face" of the substrate (the front face generally being convex) is intended to mean the face which, when the article is being used, is furthest from the eye of the wearer.

Although the article according to the invention can be any optical article capable of being confronted with the formation of fogging, such as a screen, a window for the motor vehicle industry or the construction industry, or a mirror, it is preferably an optical lens, better still an ophthalmic lens, for spectacles, or a blank for an optical or ophthalmic lens.

The precursor coating for the anti-fog coating is in direct contact either with a main surface of the substrate, or with a first coating, when said main surface of the substrate is coated with a first coating. The first coating of the invention, which preferably comprises silanol groups at its surface, may be formed on at least one of the main faces of a bare substrate, i.e. an uncoated substrate, or on at least one of the main faces of a substrate already coated with one or more functional coatings.

In the remainder of the application, the preparation of the layers will be described by direct deposition of these layers on the optical article.

The invention also comprises an embodiment in which the deposition of all of the layers or of some of them is carried out on a film having a face comprising said coatings and a face intended to be adhesively bonded to the surface of the optical article. Apart from the adhesive bonding, the desired coatings may also be transferred from a support on which the coatings have been deposited in the reverse order to which they may appear on the final article.

The substrate of the optical article according to the invention, which comprises at least one main surface, may be a mineral or organic glass, for example an organic glass made of thermoplastic or thermosetting plastic.

The substrate of the article according to the invention can be chosen from the substrates mentioned in the application WO 2008/062142, for example a substrate obtained by (co)polymerization of diethylene glycol bis(allyl carbonate), a substrate made of poly(thio)urethane or based on polyepisulfide or a substrate made of (thermoplastic) bisphenol A polycarbonate, denoted PC, or a substrate made of PMMA (polymethyl methacrylate).

In some applications, it is preferable for the main surface of the substrate to be coated with one or more functional coatings prior to the deposition of the first coating. These functional coatings conventionally used in optics can, without limitation, be a layer of impact-resistant primer, an abrasion-resistant and/or scratch-resistant coating, a polarized coating, a photochromic coating or a colored coating, in particular a layer of impact-resistant primer coated with an abrasion-resistant and/or scratch-resistant layer.

The first coating may be deposited on an abrasion-resistant and/or scratch-resistant coating. The abrasion-resistant and/or scratch-resistant coating may be any layer conventionally used as an abrasion-resistant and/or scratch-resistant coating in the field of ophthalmic lenses.

The coatings resistant to abrasion and/or to scratches are preferably hard coatings based on poly(meth)acrylates or on silanes generally comprising one or more mineral fillers intended to increase the hardness and/or the refractive index of the coating once cured. They are described in greater detail in application WO 2011/080472.

It is possible, prior to the deposition of the abrasion-resistant and/or scratch-resistant coating, to deposit, on the substrate, a primer coating which improves the impact resistance and/or the adhesion of the subsequent layers in the final product. These coatings can be any impact-resistant primer layer conventionally used for articles made of transparent polymer material, such as ophthalmic lenses, and are described in greater detail in application WO 2011/080472.

The first coating according to the invention may in particular be an abrasion-resistant and/or scratch-resistant coating or, according to the preferred embodiment, a single-layer antireflective coating or a multilayer antireflective coating. This first coating preferably comprises silanol groups at its surface.

The expression "coating comprising silanol groups at its surface" is intended to mean a coating which naturally has silanol groups at its surface or else a coating having silanol groups that were created after it was subjected to a surface activation treatment. This coating is preferably a coating based on siloxanes or on silica, for example, without limitation, a silica layer, a sol-gel coating, based in particular on organosilanes, such as alkoxysilanes, or a coating based on silica colloids. It can in particular be an abrasion-resistant and/or scratch-resistant coating or a single-layer antireflective coating or a multilayer antireflective coating, the outer layer of which has silanol groups at its surface. The term "outer layer" of a stack is intended to mean the layer of the stack that is furthest from the substrate.

The surface activation treatment optionally employed to create silanol groups or at least to increase their proportion at the surface of a coating is generally carried out under vacuum. It may be a bombardment with energetic and/or reactive species, for example an ion beam (ion pre-cleaning or IPC) or an electron beam, a corona discharge treatment, a glow discharge treatment, a UV treatment or a vacuum plasma treatment. It may also be an acidic or basic surface treatment and/or a treatment with solvents. Several of these treatments can be combined.

Energetic (and/or reactive) species are understood in particular to mean ionic species having an energy ranging from 1 to 300 eV, preferentially from 1 to 150 eV, better still from 10 to 150 eV and even better still from 40 to 150 eV. The energetic species can be chemical species, such as ions or radicals, or species such as photons or electrons.

The coating comprising silanol groups at its surface is preferably a layer with a low refractive index based on silicon oxide, preferentially on silica (comprising silica) and ideally consists of a layer of silica ($SiO_2$), generally obtained by vapor deposition. Said silica-based layer preferably has a thickness of less than or equal to 500 nm, better still from 2 to 110 nm and preferentially varying from 5 to 100 nm.

The coating comprising, at its surface, silanol groups preferably comprises at least 70% by weight of $SiO_2$, better still at least 80% by weight of $SiO_2$ and even better still at least 90% by weight of $SiO_2$. As has been said, in an optimum embodiment, it comprises 100% by weight of silica.

The coating comprising silanol groups at its surface may also be a sol-gel coating based on silanes such as alkoxysilanes, organosilanes, and optionally comprising colloidal oxides, as described in greater detail in application WO 2012/153072.

According to one embodiment of the invention, the coating comprising silanol groups at its surface is a silica-based layer deposited on an abrasion-resistant coating, preferably deposited directly on this abrasion-resistant coating.

According to another embodiment of the invention, which constitutes the preferred embodiment, the optical article according to the invention comprises an antireflective coating. When such a coating is present, it generally constitutes the first coating within the meaning of the invention. This antireflective coating can be any antireflective coating conventionally used in the optical field, in particular the field of ophthalmic optics.

An "antireflective coating" is defined as a coating, deposited at the surface of an optical article, which improves the antireflective properties of the final optical article. It makes it possible to reduce the reflection of light at the article/air interface over a relatively broad portion of the visible spectrum.

As is also well known, antireflective coatings conventionally comprise a single-layer or multilayer stack of dielectric materials. These are preferably multilayer coatings, comprising layers of high refractive index (HI) and layers of low refractive index (LI). The composition of these coatings, their thickness and their method of deposition are described in particular in applications WO 2010/109154 and WO 2012/153072.

Before the formation of the precursor for the anti-fog coating on the first coating or on the bare substrate, it is normal to subject the surface of this first coating or of the substrate to a physical or chemical activation treatment intended to increase the adhesion of the precursor for the anti-fog coating. These treatments can be chosen from those described above for the activation of the coating comprising silanol groups at its surface.

According to the invention, the first coating, when it is present, is directly in contact with the precursor coating for the anti-fog coating. According to another embodiment, the substrate is itself directly in contact with the precursor coating for the anti-fog coating, which will now be described.

The precursor coating for the anti-fog coating is formed from a material containing hydrophilic groups and fluorinated hydrophobic groups, obtained by depositing, at the surface of the optical article, at least one organosilane compound having at least one silicon atom bearing at least one hydrolyzable group, at least one non-hydrolyzable group comprising a hydrophilic group, and at least one non-hydrolyzable group comprising a hydrophobic group having at least one fluorine atom, said hydrophilic group and said hydrophobic group not both being included in the main chain of one and the same substituent of the silicon atom.

The non-hydrolyzable group comprising a hydrophilic group and the non-hydrolyzable group comprising a hydrophobic group having at least one fluorine atom can be directly linked to the silicon atom, or indirectly linked by means of a spacer group. They can represent two different substituents or can be borne by two different substituents of the silicon atom (in the case of the compounds of formulae A1 and B described below), or else can be borne by one and the same substituent of the silicon atom (in the case of the compounds of formulae C, D and E described below). However, in this case, the non-hydrolyzable group comprising a hydrophilic group and the non-hydrolyzable group comprising a fluorinated hydrophobic group are not both included in the main chain of this substituent of the silicon atom, it being possible for only one of them to be in said main chain.

In the present application, a non-hydrolyzable group borne by the silicon atom is a group which cannot be hydrolyzed so as to result in the formation of a silanol group. Such a non-hydrolyzable group is preferably bonded to the silicon atom by means of a carbon atom.

Preferably, the organosilane compound corresponds to formula (I) or (II):

  (I)

  (II)

in which $G^1$ is a non-hydrolyzable group comprising a hydrophilic group, $G^2$ is a non-hydrolyzable group comprising a hydrophobic group having at least one fluorine atom, $R^1$ is a monovalent organic group bonded to the silicon by a carbon atom, the groups X, which may be identical or different, are hydrolyzable groups, A is a trivalent spacer group, n=1 or 2, m=1, 2 or 3. Preferably, n=2 and m=3.

The organosilane compound of the invention preferably comprises a silicon atom bearing at least two hydrolyzable groups, in particular two or three hydrolyzable groups, preferably two.

The hydrolyzable groups, which may be identical or different, denoted X in formulae I and II above, are preferentially chosen from the groups OH, alkoxy —O—$R^3$, wherein $R^3$ is a linear or branched, preferentially $C_1$-$C_4$, better still $C_1$, alkyl radical, acyloxy —O—C(O)$R^4$ wherein $R^4$ is a linear or branched, preferentially $C_1$-$C_6$, alkyl radical, preferably methyl or ethyl, halogens such as Cl and Br, trimethylsiloxy $(CH_3)_3SiO$—, —$NH_2$, —NH—$R^4$ where $R^4$ is an alkyl group as defined above, dialkylamino groups in which the linear or branched alkyl groups are preferentially $C_1$-$C_6$ alkyl (for example —$N(CH_3)_2$ and —$N(C_2H_5)_2$ groups), a silazane group linked to the silicon atom by means of its nitrogen atom, such as the —$NHSiMe_3$ group or an —NHSi group in which the silicon atom is trisubstituted with $G^1$, $G^2$ and/or $R^a$ groups ($G^1$, $G^2$ being as defined above and $R^a$ denoting a monovalent organic group bonded to the silicon by a carbon atom) for example an —NHSi $(G^1)(G^2)(R^a)$ group, and/or combinations of these groups. In the present application, a hydroxyl group is considered to be a hydrolyzable group. Preferably, the hydrolyzable groups, which act as grafting heads, are alkoxy groups, in particular methoxy or ethoxy, and better still ethoxy, groups.

According to preferred embodiments, the organosilane compound comprises a dialkoxysilyl group such as a diethoxysilyl or dimethoxysilyl group, a trialkoxysilyl group such as a triethoxysilyl or trimethoxysilyl group, or else a silazane group. The preferred organosilane compounds are dialkoxysilanes.

Preferably, the organosilane compounds of the invention comprise one or two silicon atoms bearing at least one hydrolyzable group, better still just one hydrolyzable group.

The $R^1$ group, when it is present in the compounds of formula I or II, is a monovalent organic group bonded to the silicon by a carbon atom. It is preferably a saturated or unsaturated, linear or branched, preferably $C_1$-$C_{10}$ and better still $C_1$-$C_4$, hydrocarbon-based group, for example an alkyl group, such as methyl or ethyl, a vinyl group or an aryl group, for example a monocyclic or bicyclic aromatic group for example a phenyl group, which is optionally substituted, in particular by one or more $C_1$-$C_4$ alkyl groups. Preferably, $R^1$ represents the methyl group.

The amphiphilic organosilane compound of the invention bears at least one hydrophilic group. The term "hydrophilic" groups is intended to mean, in the context of the present invention, combinations of atoms which are capable of associating with water molecules, especially by hydrogen bonding. These are generally polar organic groups, which may comprise charged atoms. The organosilane compound preferably comprises at least one group chosen from polyoxyalkylene, polyamine, polyol (polyhydroxylated group, for example a polysaccharide or polyglycerol group), polyether (for example a polyol ether) or sulfonate groups, preferably a polyoxyalkylene, polyamine or polyol group, better still a polyoxyalkylene group. According to another embodiment, the hydrophilic group is chosen from polyoxyalkylene, polyol and polyether groups.

In the organosilane compounds of the invention, and in particular in the compounds of formula (I), the non-hydrolyzable group comprising a hydrophilic group ($G^1$ group) generally has the formula -L-$R^2$, wherein L is a linear or branched divalent group bonded to the silicon atom by a carbon atom and $R^2$ is a group comprising a polyoxyalkylene group bonded to the L group by means of an oxygen atom, this oxygen atom being included in the $R^2$ group. Nonlimiting examples of L groups are the linear or branched, preferably $C_1$ to $C_{15}$, and better still $C_2$ to $C_{15}$, and even better still $C_2$ to $C_{10}$ alkylene groups which are optionally substituted, a monocyclic or bicyclic $C_3$-$C_{10}$ cycloalkylene group, preferably a monocyclic or bicyclic $C_3$-$C_{10}$ arylene group, carbonyl or amido (preferably NHCO) groups, or combinations of these groups such as the cycloalkylenealkylene, biscycloalkylene, biscycloalkylenealkylene, arylenealkylene, bisphenylene, bisphenylenealkylene or amidoalkylene groups, one example of which is the $CONH(CH_2)_3$ group, or else the $—OCH_2CH(OH)CH_2—$ and $—NHC(O)—$ groups. The preferred L groups have from 1 to 4 carbon atoms and/or are preferably linear, alkylene groups preferably having 10 carbon atoms or fewer, better still 5 carbon atoms or fewer, for example ethylene and propylene groups.

The hydrophilic group and/or the $G^1$ group of the organosilane compound preferably comprise from 2 to 100 carbon atoms, better still from 6 to 80 carbon atoms and even better still from 8 to 60 or from 10 to 30 carbon atoms. In one embodiment, this or these group(s) comprise(s) less than 80, better still less than 60, and even better still less than 50 carbon atoms. The preferred polyoxyalkylene groups are polyoxyethylene groups $—(CH_2CH_2O)_{n''}—$ (n" varying in proportions compatible with the chain lengths indicated above), polyoxypropylene groups, or combinations of these groups. The preferred $R^2$ groups comprise a polyoxyalkylene group satisfying these characteristics.

The non-hydrolyzable group comprising a hydrophilic group ($G^1$ group) is preferably a group of formula:

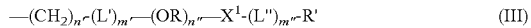

$$—(CH_2)_{n'}-(L')_{m'}—(OR)_{n''}—X^1-(L'')_{m''}-R'$$ (III)

wherein R' is a hydrogen atom, an acyl group or an alkyl group which is a linear or branched, preferentially $C_1$-$C_{10}$ and better still $C_1$ to $C_5$ or $C_1$ to $C_4$, group which can be optionally substituted with one or more functional groups and which can additionally comprise one or more double bonds, R is a linear or branched alkylene group, preferably a linear alkylene group, preferably comprising from 2 to 4 carbon atoms, better still from 2 to 3 carbon atoms, for example an ethylene or propylene group, L' and L" are linear or branched divalent groups, which may be identical or different, X' represents O, NH or S, preferably an oxygen atom, n' is an integer ranging from 0 to 10, preferably from 1 to 10 or from 1 to 5, better still equal to 3, n" is an integer ranging from 1 to 50, preferably from 3 to 50, 4 to 50, 4 to 30, 5 to 25 or 5 to 15, m' is equal to 0 or 1, preferably 0, m" is equal to 0 or 1, preferably 0.

According to preferred embodiments, n" is equal to 3 or else varies from 6 to 9, from 9 to 12, from 21 to 24 or from 25 to 50, preferably from 6 to 9.

The L' and L" groups, when they are present, may be chosen from the divalent L groups described above and preferably represent the $—OCH_2CH(OH)CH_2—$ group or the $—NHC(O)—$ group. In this case, the $—OCH_2CH(OH)CH_2—$ or $—NHC(O)—$ groups are connected to the adjacent groups $(CH_2)_{n'}$ (in the case of an L' group) and R' (in the case of an L" group) via their oxygen atom (for the $—OCH_2CH(OH)CH_2—$ group) or via their nitrogen atom (for the $—NHC(O)—$ group).

The $—X^1-(L'')_{m''}-R'$ group is preferably an alkoxy group (m"=0, R'=alkyl, X'=O), ideally a methoxy group.

According to one embodiment, R' denotes an alkyl group having fewer than 5 carbon atoms, preferably the methyl group. R' can also denote an aliphatic or aromatic acyl group, in particular the acetyl group.

Finally, R' can denote a trialkoxysilylalkylene or trihalosilylalkylene group, such as the $—(CH_2)_jSi(R^5)_3$ group, the $R^5$ groups being identical or different and representing hydrolyzable groups such as the X groups defined previously, and j is an integer such as the n' group defined previously. An example of such an R' group is the $—(CH_2)_3Si(OC_2H_5)_3$ group. In this embodiment, the organosilane compound comprises two silicon atoms bearing at least one hydrolyzable group.

The preferred $G^1$ group is an alkoxy(polyalkyleneoxy) alkyl group.

The amphiphilic organosilane compound of the invention bears at least one hydrophobic group having at least one fluorine atom. The term "hydrophobic" groups is intended to mean, in the context of the present invention, combinations of atoms which are capable not capable of associating with water molecules, in particular by hydrogen bonding. These are generally nonpolar organic groups, which are free of charged atoms. The organosilane compound therefore comprises at least one hydrophobic fluorinated group, preferably perfluorinated group, typically a fluorocarbon group (that is to say containing carbon and fluorine), preferentially chosen from fluoroalkyl, fluoroalkenyl, perfluoroalkyl, perfluoroalkenyl, (poly)(fluoro alkyl ether), (poly)(perfluoro alkyl ether) and (poly)fluoro alkoxy[(poly)alkyleneoxy] alkyl groups, preferably fluoroalkyl groups.

These linear, cyclic or branched groups may be directly connected to one another or may be connected by means of divalent groups, in particular alkylene or alkenylene groups, oxygen atoms or nitrogen bridges ($—NH—$, $—N=$). The fluorocarbon groups preferably comprise at least 50% of fluorine atoms as a replacement for the hydrogen atoms of the hydrocarbon group from which they derive, better still at least 70% and even better still at least 90%. These groups may for example comprise units such as $—CHF—$, $—CHF—CHF—$, $—CH_2—C(CF_3)_2—$, $—CF_2—C(CF_3)_2—$, $—CF_2—$, $—CF_2—CF_2—$, $—CF_2—CF_2—CF_2—$, $—CF_2—C(CF_3)_2—$, $—(CHF)_n—$ and $—(CF_2)_n—$, n denoting an integer greater than or equal to 3.

A poly(fluoro alkyl ether) group is intended to mean a group resulting from the polymerization of fluoroalkoxy units of from the copolymerization of these units with other units such as alkoxy units. Examples of such groups are the $—(CHF—CHF—O)_n—$, $—(CH_2—CF_2—O)_n—$, $—(CF_2—CF_2—O)_n—$, $—(CF_2—CF_2—CF_2—O)_n—$, $—(CF_2—CH(CF_3)—O)_n—$, $—(CF_2—CF(CF_3)—O)_n—$ groups, n denoting an integer greater than or equal to 1. Such compounds may also include polyalkoxy units such as $—(CH_2—CH_2—O)_m—$, $—(CH_2—CH_2—CH_2—O)_m—$ and $—(CH_2—C(CH_3)_2—O)_m—$, m denoting an integer greater than or equal to 1.

In the organosilane examples of the invention, and in particular in the compounds of formula (I), the non-hydrolyzable group comprising a fluorinated hydrophobic group ($G^2$ group) generally has the formula -L-$R^6$, wherein L is a divalent group bonded to the silicon atom by a carbon atom and $R^6$ is a group comprising a fluorocarbon group bonded to the L group by means of a carbon atom. The L groups can be chosen from those previously mentioned for the -L-$R^2$ groups.

The fluorinated hydrophobic group and/or the $G^2$ group of the organosilane compound preferably comprise from 2 to 100 carbon atoms, better still from 3 to 50 carbon atoms and even better still from 4 to 30, 5 to 20 or 5 to 15 carbon atoms. In one embodiment, this or these group(s) comprise(s) less than 80, better still less than 40, and even better still less than 25 carbon atoms. The preferred $R^6$ groups comprise a polyoxyalkylene group satisfying these characteristics.

The non-hydrolyzable group comprising a hydrophobic group having at least one fluorine atom ($G^2$ group) is preferably a fluorinated group of formula:

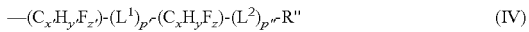

(IV)

wherein R" is a hydrogen or fluorine atom, an acyl group or an alkyl group which is linear or branched, which can be substituted with one or more heteroatoms or functional groups, and which can additionally comprise one or more double bonds, $L^1$ and $L^2$ are linear or branched divalent groups which may be identical or different, x' is an integer ranging from 0 to 10, preferably from 1 to 10 or from 1 to 5, better still equal to 3, y' and z' are integers such that y'+z'=2x', x is an integer ranging from 1 to 40, preferably from 1 to 15, better still from 2 to 8, y and z are integers such that y+z=2x, p' is equal to 0 or 1, preferably 0, and p" is equal to 0 or 1, preferably 0. R" can also denote an aliphatic or aromatic acyl group, in particular the acetyl or trifluoroacetyl group.

The R" group is preferably a fluoroalkyl, better still perfluoroalkyl, group which is linear or branched. It preferably comprises from 1 to 10 carbon atoms, better still from 1 to 5 and ideally from 1 to 3 carbon atoms and represents in particular the trifluoromethyl group.

The group of formula ($C_xH_yF_z$) is preferably a group of formula ($CF_2$)$_x$, wherein x is as defined previously. The group of formula ($C_{x'}H_{y'}F_{z'}$) is preferably a group of formula ($CH_2$)$_{x'}$, wherein x' is as defined previously.

The $L^1$ and $L^2$ groups, when they are present, can be chosen from the divalent groups L, L' and L" previously mentioned and can also represent oxyalkylene (—O-alkylene-) or alkyleneoxy (-alkylene-O—) groups which are preferably $C_2$-$C_4$ groups, better still $C_2$-$C_3$ groups. The -($L^2$)$_{p''}$-R" group is preferably a fluoroalkyl or perfluoroalkyl group, ideally a trifluoromethyl group.

Examples of $G^2$ groups that can be used in the invention are the groups of formulae:

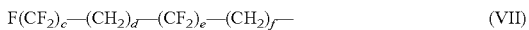

(VII)

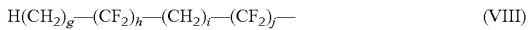

(VIII)

wherein each of c, d, e, f, g, h, i and j denote an integer ranging from 0 to 10, at least one of c, d, e and f is other than 0, at least one of g, h, i and j is other than 0. Preferably, 5≤c+d+e+f≤15 and/or 5≤g+h+i+j≤15, and better still 5≤c+d+e+f≤12 and/or 5≤g+h+i+j≤12.

The preferred $G^2$ group is a (perfluoroalkyl)alkyl group.

In the compounds of formula II, the $G^1$ and $G^2$ groups can be borne by one and the same atom of the spacer group A (typically a carbon atom), or by two different atoms of the spacer group A, which are adjacent or nonadjacent. In these compounds, the $G^1$ and $G^2$ groups correspond respectively to the $R^2$ and $R^6$ groups mentioned above. They are linked to the silicon atom by means of a trivalent spacer group A, which is generally a hydrocarbon-based group comprising from 1 to 20 carbon atoms, better still from 1 to 10 carbon atoms, and even better still from 1 to 4 carbon atoms, which group can be substituted with one or more functional groups, and which can additionally comprise one or more double bonds. More preferably, the spacer group A is a hydrocarbon-based group comprising from 1 to 2 carbon atoms, preferably 1 carbon atom. The group A may be of aliphatic nature or may comprise at least one aromatic group. It is preferably an aliphatic group, in particular a methine group.

Nonlimiting examples of trivalent spacer groups A that can be used in the present invention are represented below, wherein k denotes an integer preferably ranging from 0 to 10, more preferably from 0 to 2, even more preferably 0 or 1. Preferably, k denotes 0. In these formulae, the spacer group is preferably connected to the silicon atom via the carbon atom located at the right-hand end of the formula:

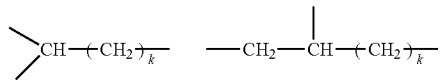

Examples of families of organosilane compounds according to the invention having a hydrophilic group and a fluorinated hydrophobic group not included in the main chain of the same substituent of the silicon atom are those having the formulae:

(A1)

(B)

(C)

(D)

(E)

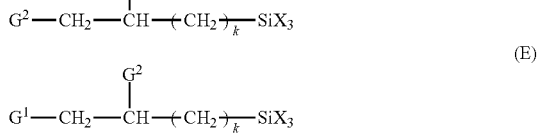

in which the $G^1$, $G^2$ and X groups are as defined previously, the $R^a$ and $R^b$ groups, which may be identical or different, are monovalent organic groups bonded to the silicon by a carbon atom, and k is an integer ranging from 0 to 10. $R^a$ and $R^b$ can be chosen from the $R_1$ groups previously described. In the compounds of formula B, the Si—N bonds are hydrolyzable.

The preferred organosilane compounds according to the invention are those of formula I, and among these, those of formulae A1 and B, preferably of formula A1. In these formulae, the preferred $G^1$ and $G^2$ groups are those of formulae III and IV.

The preferred organosilane compounds of formula II are those of formulae C, D and E. In these formulae, the preferred $G^1$ and $G^2$ groups are those of formulae III and IV. According to one embodiment, the organosilane compound is a compound of formula II, C, D or E having at least one group of formula III and/or at least one group of formula IV in which x'=0 and/or n'=0.

The preferred families of organosilane compounds are those of the [alkoxy (polyalkyleneoxy)alkyl][(perfluoroalkyl)alkyl]dialkoxysilanes or the dihalogenated analogs thereof (compounds of formula I with $G^1$ and $G^2$ groups of formulae III and IV in which n=2, m'=m"=p'=p"=0, R'=alkoxy, R"=perfluoroalkyl).

As examples of organosilane compounds according to the invention, mention may be made of the following preferred compounds or the dihalogenated analogs thereof, the preferred compound being that of formula (V):

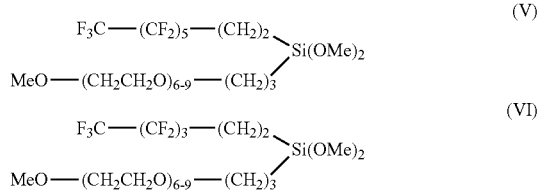

Preferably, the molar mass of the organosilane compound according to the invention ranges from 400 to 4000 g/mol, preferably from 400 to 2000 g/mol, better still from 500 to 1500 g/mol and even better still from 500 to 1200 g/mol.

The organosilane compounds of the invention can be obtained by functionalization of derivatives of hydrosilane nature by the $G^1$ and $G^2$ groups or groups bearing the $G^1$ and $G^2$ groups, in particular by functionalization of dihydrosilanes for the compounds of formulae A and B, via olefin hydrosilylation reactions, or starting from halosilanes via nucleophilic substitution reactions, in the presence of catalysts such as Grignard reagents or catalysts of the transition metal complex, such as platinum complex, type, for example the Speier reagent ($H_2PtCl_6$, $6H_2O$). These reactions are well controlled by those skilled in the art.

The precursor coating for the anti-fog coating according to the invention, formed from at least one organosilane compound according to the invention, preferably having a polyoxyalkylene group and a fluorocarbon group as defined above, also constitutes an anti-fouling coating. It in particular has better cleanability properties, that is to say great ease of cleaning or wiping. It generally makes it possible to lower the surface energy of the optical article to 25 mJ/m$^2$ or less. The surface energies are calculated in the present application using the Owens-Wendt method described in the following reference: "Estimation of a surface force energy of polymers" OWENS D. K., WENDT R. G. (1969) J. Appl. Polym. Sci, 13, 1741-1747.

The precursor coating for the anti-fog coating preferably has a static contact angle with water of greater than or equal to 50°, more preferably greater than or equal to 60°, better still greater than or equal to one of the following values: 70°, 80°, 90°, 95°, 100°. In one embodiment, the precursor coating for the anti-fog coating has a static contact angle with water ranging from 50° to 100°, better still from 50° to 90° and even better still from 60° to 80°.

The contact angle value can be adjusted by those skilled in the art by varying in particular the nature, the flexibility and the relative size of the hydrophilic and hydrophobic groups of the organosilane compound according to the invention.

The precursor coating for the anti-fog coating has a low contact angle hysteresis, generally less than 10°. The contact angle hysteresis (Δθ) is defined as being the difference between the advancing contact angle (θa) and the receding contact angle ($θ_r$) ($Δθ=θ_a-θ_r$). The receding and advancing contact angles are defined in the doctoral thesis—Université Paris 7—Denis Diderot, presented by Nolwenn Le Grand—Piteira and defended at the ESCPI on Jun. 21, 2006, in particular Chapter 1, pages 19-20, paragraph 1.3.4 "Une loi insuffisante dans la réalité—Hystérésis du mouillage" ["A law insufficient in reality—Hysteresis of wetting"].

In the present patent application, the static contact angles can be determined according to the liquid drop method, according to which a liquid drop having a diameter of less than 2 mm (typically 4 μl) is deposited gently on a nonabsorbent solid surface and the angle at the interface between the liquid and the solid surface is measured. Water has a conductivity of between 0.3 μS and 1 μS at 25° C.

Typically, the static contact angle measurements are carried out with a Kruss DSA 100 apparatus (Drop Shape Analysis system), and the receding and advancing contact angle measurements are carried out with the same apparatus under the same conditions, but on an inclined plane.

Preferably, the precursor for an anti-fog coating of the invention comprises less than 5% by weight of metal oxide or semimetal oxide (for example silica or alumina), relative to the total weight of the coating, and better still does not comprise it. When the organosilane compound used for the formation of the anti-fog coating is deposited under vacuum, preferably no metal oxide is coevaporated with it, according to the technique for the coevaporation of at least one organic compound and of at least one inorganic compound described in the application EP 1 324 078.

According to the invention, the deposition of the organosilane compound can form a precursor coating for an anti-fog coating comprising an inner portion in which said organosilane compound is grafted to the first coating (when it is present) or to the substrate in a permanent manner (by means of a covalent bond and not by simple adsorption), and an outer portion that can be removed by washing and/or wiping (mechanically and/or chemically).

In order to arrive at such a structure, it is possible to deposit an excess of organosilane compound at the surface of the first coating or of the substrate, preferably comprising silanol groups, preferentially an excess of organosilane compound. Adjusting the deposition parameters in order to arrive at such a configuration is within the scope of those skilled in the art. The term "excess" is intended to mean that an amount of organosilane compound has remained free, that is to say that it is not grafted by a covalent bond, either with the first coating or with the substrate.

The silicon atom bearing at least one hydrolyzable group of the organosilane compound, in particular a silanol group or a precursor thereof, is a reactive group capable of establishing a covalent bond with a functional group present on the outer surface of the substrate or of the first coating on which it will be grafted. According to one embodiment, at least one of the Si—X groups of the organosilane compound (X denoting a hydrolyzable group) is covalently bonded to a hydroxyl group of the substrate or of the first coating.

The precursor coating for the anti-fog coating is a coating preferably having a thickness (before wiping) of greater than or equal to 3 nm, better still ≥5 nm, even better still ≥8 nm and ideally ≥10 nm. Its thickness is preferentially less than 100 nm, better still ≤50 nm and even better still ≤25 nm. It typically ranges from 3 to 100 nm, preferably from 5 to 50 nm.

The precursor coating for the anti-fog coating is formed by deposition at the surface of the first coating or on the substrate of at least one organosilane compound according to the invention, which is a film-forming compound, followed by grafting. This deposition can be carried out according to usual techniques, preferably by gas-phase or liquid-phase deposition, better still gas-phase deposition, generally in a vacuum chamber.

The vapor deposition may consist of a physical vapor deposition (PVD) or a chemical vapor deposition (CVD), such as, without limitation, an evaporation, optionally ion-beam evaporation, spray coating or plasma-enhanced chemical vapor deposition. The preferred method is physical vapor deposition, in particular vacuum evaporation, generally combined with a heating of the compounds to be evaporated. It may be implemented by using evaporation systems as diverse as a Joule-effect heat source (the Joule effect is the thermal manifestation of the electrical resistance) or an electron gun, it being possible for any other device known to those skilled in the art to also be used.

The organosilane compound can be dissolved beforehand in a solvent before being evaporated, in order to exert better control over the rate of evaporation and of deposition. The organosilane compound is preferably deposited by vacuum evaporation using a Joule-effect heat source. For this, it is possible to place the organosilane compound in a metal container, for example a copper dish, positioned on a Joule-effect system. The copper dish may contain steel wool or a metal foam (preferably nickel foam). In one embodiment, the organosilane compound is impregnated in the steel wool or metal foam.

The duration of the deposition process and in particular of the evaporation is adjusted so as to obtain the desired coating thickness. The deposition conditions are selected so that, after the deposition of the organosilane compound, a coating having a static contact angle with water of preferentially greater than 50° is obtained. The nature of the compounds used and the deposition time are examples of parameters that those skilled in the art will know how to vary in order to achieve the coating having the desired properties.

The precursor coating for the anti-fog coating may be obtained by directly depositing the suitable amount of organosilane compound.

However, the inventors have found that it is preferable to form the precursor coating for the anti-fog coating by depositing an excess of organosilane compound at the surface of the optical article, and by removing the excess of this compound, deposited but not grafted, so as to arrive at the same desired final thickness. This procedure guarantees the anti-fog performance of the treated lenses. The inventors have indeed found that, when a layer of precursor coating was deposited directly without excess thickness, it was possible, in some cases, to obtain an uneven deposition and a precursor coating for the anti-fog coating, the surface of which does not have a sufficient affinity with regard to a liquid solution of surfactant, which results in a coating that does not have the desired anti-fog properties.

After the deposition of the organosilane compound in accordance with the invention, the outer portion of the coating that can be removed by wiping may be removed, by washing and/or wiping, or else may be subjected to the removal technique described in application WO 2012/153072, which involves the use of a temporary layer, in the case where such a temporary layer was deposited. The outer portion of the precursor coating for the anti-fog coating can be removed by washing and/or wiping, which means that it may be removed by subjecting it in particular to washing with soapy water (containing a surfactant), using a sponge, and then with deionized water, and/or to wiping for typically 20 seconds or less, using a CEMOI™, Wypall™ or Selvith™ fabric which is dry or optionally impregnated with alcohol, typically isopropyl alcohol. This wiping operation can optionally be followed by a further rinsing with deionized water and by a final wiping with a cloth.

After removal of the surplus of organosilane compound deposited, that is to say of the outer portion of the precursor coating for the anti-fog coating which can be removed by wiping, only the inner portion of the precursor coating for the anti-fog coating containing the organosilane compound actually grafted remains at the surface of the first coating according to the invention or of the substrate. The ungrafted molecules are thus discharged. The inner portion of the precursor coating cannot be removed by means of a mild treatment such as dry wiping using a fabric or a similar treatment, or else wiping with a fabric impregnated with water, soapy water or an alcohol such as isopropyl alcohol.

The invention also relates to a process for preparing an optical article as defined above, preferably an ophthalmic lens, comprising:

a) providing a substrate having at least one main surface, b) depositing, preferably by vacuum evaporation, on said main surface of the substrate, at least one organosilane compound as defined above, so as to obtain a precursor coating for an anti-fog coating that generally comprises an inner portion in which said organosilane compound is grafted to the substrate or, when it is present, to the first coating, and an outer portion that can be removed by washing and/or wiping.

As explained previously, the process of the invention comprises a step of exposing the main surface of the substrate or of the first coating, when said main surface of the substrate is coated with a first coating, to the organosilane compound, generally in a vacuum chamber, giving rise to the deposition of this compound.

The process of the invention may also comprise an additional stage of depositing at least one surfactant at the surface of the precursor coating for the anti-fog coating obtained after the removal of the outer portion of the precursor coating for the anti-fog coating which can be removed by wiping, thus giving access to a temporary anti-fog coating. This surfactant film provides the lenses with temporary protection against fogging by creating a uniform layer at their surface which helps in dispersing the water droplets over the surface of the lens so that they do not form visible fogging.

According to one embodiment, the surfactant is deposited by applying a film of a liquid solution containing at least one surfactant. The application of the surfactant solution can be carried out by any known technique, in particular by dip coating, spin coating or spray coating. The surfactant solution is preferentially applied by depositing a drop of this solution at the surface of the precursor for the anti-fog coating and by then spreading it so as to cover preferably all of said precursor coating. The surfactant solution applied is generally an aqueous solution, preferably comprising from 0.5% to 10% by weight, better still from 2% to 8% by weight, of surfactants.

A commercially available surfactant solution for conferring anti-fog properties is the Optifog™ Activator solution from Essilor.

According to another embodiment, which is preferred, the surfactant is applied to the precursor coating using a fabric impregnated with said surfactant, for example a dry or wet wipe, preferably which is reusable. It is ideally a dry wipe, i.e. a wipe that feels dry to the touch.

These impregnated fabrics are capable of effectively dispensing the surfactant at the surface of a substrate, by simple wiping of the surface to be treated (back-and-forth translational and/or rotational movements). Impregnated fabrics and wipes that can be used in the invention to impart anti-fog properties to a substrate, and also the method of preparation thereof, are described in detail in applications WO 2014/111513 and WO 2015/082521.

The surfactant used must be able to impart anti-fog properties to the optical article after application to the surface thereof, which can be verified by carrying out the hot vapor test described in the experimental part.

A large variety of surfactants may be used for a direct application using a solution or by means of a wipe. These can be ionic (cationic, anionic or amphoteric) or nonionic, preferably nonionic or anionic. However, a mixture of surfactants belonging to these different categories can be envisaged. Examples of surfactants that can be used are those disclosed in applications WO 2013/013929, WO 2014/111513 and WO 2015/082521. Mention may be made of polyethylene glycol alkyl monoethers, surfactants having a sorbitan ring and especially polyoxyalkylene sorbitan fatty acid esters, triblock copolymers comprising two ethylene oxide blocks and one central propylene oxide block, and compounds of polyethoxylated fluoroalkyl nature. Preferably, use is made of a surface-active agent comprising a poly(oxyalkylene) group.

The anti-fog coating of the invention obtained after the application of the surfactant to the surface of the substrate preferably has a static contact angle with water of less than or equal to 10°, better still of less than or equal to 5°. It generally constitutes the outer coating of the optical article.

The following examples illustrate the invention in more detail but without limitation. Unless otherwise indicated, all the thicknesses that appear in the present application are physical thicknesses, measured by multi-wavelength ellipsometry, after deposition.

EXAMPLES

1. Materials and Methods

The hydrophilic-hydrophobic organosilane compound used in the examples to form the precursor for the anti-fog coating is (3,3,4,4,5,5,6,6,7,7,8,8-tridecafluorooctyl)(methoxypolyethyleneoxypropyl)dimethoxysilane having 6 to 9 ethylene oxide units, of formula (V) and of molar mass 725-850 g/mol, the synthesis of which is described in the next section.

The vacuum-evaporation device making it possible to deposit the various layers (antireflective layer, precursor coating for the anti-fog coating) is a BAK2 machine equipped with a Joule-effect evaporation system which makes it possible to evaporate both organic materials and inorganic materials.

The lenses used in the examples according to the invention comprise a lens substrate made of poly(bisphenol A carbonate) (correction −8.00 diopters, +2.00 cylinder) comprising, on each of its faces, a polyurethane impact-resistant primer with a thickness of the order of 1 micron, itself coated with an abrasion-resistant coating with a thickness of the order of 3 microns by depositing and curing a composition as defined in example 3 of the patent EP 614 957, in its turn coated with an antireflective coating comprising five layers $ZrO_2/SiO_2/ZrO_2/ITO/SiO_2$ deposited on the abrasion-resistant coating by vacuum evaporation of the materials in the order in which they were mentioned (respective thicknesses of the layers: 29, 23, 68, 6.5 and 85 nm, respective deposition rates: 0.32, 0.7, 0.32, 0.13, 1.05 nm/s). The $ZrO_2$ layers are deposited with introduction of passive $O_2$ ($7.10^{-3}$ Pa) without ion assistance. The $SiO_2$ layers are deposited under a residual pressure of $4\times10^{-3}$ to $5\times10^{-3}$ Pa without ionic assistance. The ITO layer is deposited under ion assistance of oxygen ions (1 A, 100 V), without contribution of passive $O_2$. An ITO layer is an electrically conducting layer of indium oxide doped with tin ($In_2O_3$:Sn).

Before the deposition of the antireflective coating, the lenses comprising the abrasion-resistant coating are subjected to a surface activation (IPC) treatment, which consists in carrying out an ion bombardment with argon ions, under vacuum, at a pressure typically of $3.5\times10^{-5}$ mbar (1 minute, 1 A, 100 V).

In the examples, the antireflective coating is not subjected to any activation treatment before the deposition of the precursor for the anti-fog coating.

2. Preparation of Hydrophilic-Hydrophobic Organosilane Compounds According to the Invention (3,3,4,4,5,5,6,6,6-Nonafluorohexyl)(methoxypolyethyleneoxypropyl)dimethoxysilane having 6 to 9 ethylene oxide units (of formula VI) was synthesized in two steps from commercial precursors in the following way. In a first step, dimethoxysilane $H_2Si(OMe)_2$ (CAS 2768-02-7) reacts with an allyloxypolyethylene glycol (CAS 27274-31-3) having 6 to 9 ethylene oxide units in the presence of the Speier reagent ($H_2PtCl_6$, $6H_2O$) for 1 to 10 h at a temperature of between 40° C. and 100° C., in a solvent medium (isopropanol/tert-butanol mixture) so as to obtain the intermediate (A), said intermediate reacting in a second step with 1H,1H,2H-perfluoro-1-hexene (CAS 19430-93-4) under the same reaction conditions as the preceding step, so as to give the desired product which is the subject of the invention, as presented in the scheme below:

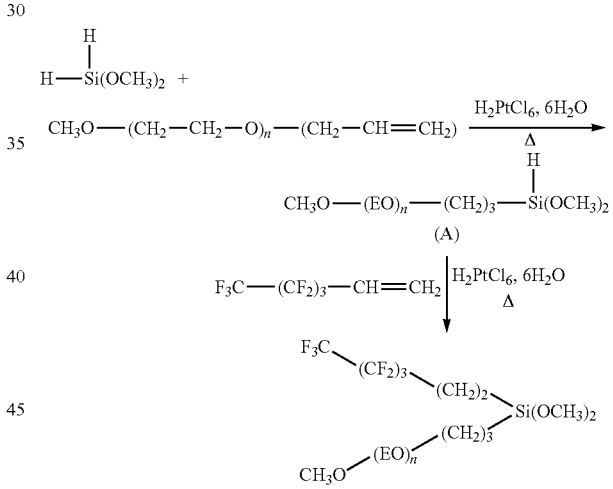

The (3,3,4,4,5,5,6,6,7,7,8,8,8-tridecafluorooctyl)(methoxypolyethyleneoxypropyl)-dimethoxysilane having 6 to 9 ethylene oxide units, of formula (V), was synthesized in a similar manner from 1H,1H,2H-perfluoro-1-octene (CAS 25291-17-2), sold by Alfa Aesar.

3. Vapor Deposition of the Precursor for the Anti-Foci Coating and Measurement of the Surface Properties Thereof The organosilane compound used to form the precursor for the anti-fog coating is, in a first step, packaged in a copper dish equipped with steel wool in order to limit the projections of product during the Joule-effect evaporation. Each dish, containing 100 to 300 μl of compound, according to the desired thickness, is preheated on a hot plate at 70° C. for 2 minutes before the evaporation step in order to remove any solvents and to degas the product, and then placed on a boat.

The deposition of the precursor for the anti-fog coating according to the invention on the antireflective coating of each face of the lenses is carried out by vacuum evaporation using a Joule-effect heat source, namely a metal boat through which an electric current passes, in which are deposited the copper dishes containing the compounds to be evaporated (rate: varying from more than 0 nm/s to 0.8 nm/s, preparation of heating under cover: 15 seconds at 120 A, heating current varying from 0 to 140 A open cover).

Various amounts of organosilane compound were evaporated in examples 1 to 3. A precursor coating for an anti-fog coating is obtained that has a thickness of the order of 4 to 17 nm (thicknesses measured with a multi-wavelength ellipsometer, including the surplus of siloxane compound).

24 hours after the deposition of the precursor for the anti-fog coating, each lens is subjected to the following washing procedure: the lens is rinsed with soapy water using a sponge (4 rotations convex face, 4 rotations concave face), thoroughly rinsed with tap water, dipped in a beaker of deionized water 3 or 4 times, dried with a cloth (Selvyt), rubbed with a Cémoi™ fabric soaked in isopropyl alcohol, thoroughly rinsed with tap water, dipped in a beaker of deionized water 3 or 4 times, dried with a cloth (Selvyt), and wiped with a dry Cémoi™ fabric so that the deposited siloxane compound surplus is discharged. The Cémoi™ fabric denotes a microfiber fabric (manufacturer KB SEIREN—distributor: Facol, reference Microfibre M8405 30×40).

The measurements of contact angles with water were carried out at this stage, on the lenses thus washed and wiped using a DSA 100 semi-automatic goniometer by image acquisition and analysis (Drop Shape Analysis system) from Kruss, equipped with the tilting table option (PA3220). In particular, the advancing and receding contact angles were measured according to the tilting plate method described in detail in application WO 2014/102298, in the applicant's name.

The results of the contact angle measurements are presented in table 1 and indicate the means obtained for the various lenses tested.

TABLE 1

| Example | Thickness of the anti-fog coating (precursor) (nm) Initial (*) | Thickness of the anti-fog coating (precursor) (nm) Final (**) | Advancing contact angle (°) | Receding contact angle (°) | Static contact angle (°) | Hysteresis (°) |
|---|---|---|---|---|---|---|
| 1 | 4 | 1-3 | 72 | 38 | 63 | 9 |
| 2 | 8 | 1-3 | 70 | 30 | 61 | 9 |
| 3 | 17 | 1-3 | 69 | 41 | 61 | 8 |
| Comp. | 10 | 1-3 | 44 | 27 | 39 | 17 |

(*) Before removal of the surplus of organosilane compound deposited.
(**) After removal of the surplus of organosilane compound deposited.

It is noted that the thickness of the precursor coating for the anti-fog coating has little influence on the values of the contact angles and the hysteresis.

In table 1, the comparative example corresponds to example 3 of application WO 2011/080472, in the applicant's name. In this example, the precursor for the anti-fog coating was formed by vapor deposition of the organosilane compound 2-[methoxy(polyethyleneoxy)propyl]trimethoxysilane having 6 to 9 ethylene oxide units.

The precursors for the anti-fog coating according to the invention have better anti-fouling properties than the coating of the comparative example because of their higher static contact angle, and a much improved hysteresis.

4. Formation of the Temporary Anti-Fog Coating and Evaluation of the Anti-Fog Performances The lenses washed and wiped in accordance with the protocol of the preceding section are wiped on both their faces with a wipe made of Cémoi™ fabric impregnated with surfactant (Capstone® FS 3100, 30% by weight) by performing a spiralling movement from the center to the edge with the wipe, so as to "load" them with surfactant, while taking care to cover the entire surface (without excessive pressure). This corresponds to one application. Various levels of application may be carried out, for example 5, 10, 15 or 20 applications.

The lenses are then placed for 24 hours in a chamber that is regulated in terms of temperature (20-25° C.) and at a humidity of 50%, then placed for 15 seconds above a heated receptacle containing water at 55° C. (hot steam test). Immediately afterward, a visual acuity chart located 3-4 m from the point of control is observed through the lens placed less than 10 cm from the eye, and a grading is carried out (detailed below) by verifying the uniformity of the transparency and the absence of fogging.

The test, carried out under ambient lighting (without directive lighting) is considered to be passed if an observer who has 10/10 vision and who has the lens placed in front of his eye obtains a visual acuity of at least $6/10^{th}$ (in transmission, Raskin table placed 3-4 meters away, Armaignac Tridents, ref. T6 chart available from FAX INTERNATIONAL), and no impairing fogging or visual distortion is observed (grading scale 1 or 2).

On the other hand, a lens is declared to be non-compliant (grading scale 3) if the transparency is not total transparency (presence of fogging) and/or non-uniform.

The grading grid is the following:

Grade 1: Uniform film of water, possible presence of non-impairing dust.

Grade 2: Presence of non-impairing distortion points.

Grade 3: Non-uniform film of water, reading distorted and/or presence of fogging.

This test makes it possible to simulate the conditions of ordinary life where a wearer places his face above a cup of tea or coffee or a saucepan of boiling water.

The results of the anti-fog performance tests carried out on several samples of lenses are presented in table 2.

TABLE 2

| Example | 5 applications of surfactant | 10 applications of surfactant | 15 applications of surfactant | 20 applications of surfactant |
|---|---|---|---|---|
| 1 | 25% grade 2<br>75% grade 3 | 100% grade 2 | 100% grade 1 | 100% grade 1 |
| 2 | 25% grade 2<br>75% grade 3 | 100% grade 2 | 100% grade 1 | 100% grade 1 |
| 3 | 18% grade 1<br>55% grade 2<br>27% grade 3 | 100% grade 1 | 100% grade 1 | 100% grade 1 |

It is noted that 5 surfactant application cycles are not sufficient to reach a 100% level-1 performance. Nevertheless, a larger anti-fog coating precursor thickness makes it possible to achieve this. Increasing the number of application cycles to 10, 15 and 20 shows that, with a thickness of 17 nm (example 3), 10 application cycles are sufficient to obtain a level-1 performance. For anti-fog coating precursor thicknesses of 4 and 8 nm (examples 1 and 2), 5 additional application cycles are required to achieve level 1.

The invention claimed is:

1. An organosilane compound comprising at least one silicon atom bearing at least one hydrolyzable group, at least one non-hydrolyzable group comprising a hydrophilic group, and at least one non-hydrolyzable group comprising a hydrophobic group having at least one fluorine atom, said hydrophilic group and said hydrophobic group not both being included in the main chain of one and the same substituent of the silicon atom.

2. The organosilane compound of claim 1, wherein the hydrophilic group is a polyoxyalkylene group.

3. The organosilane compound of claim 1, wherein the non-hydrolyzable group comprising a hydrophilic group is a group of formula:

wherein R' is a hydrogen atom, an acyl group or an alkyl group which is linear or branched, R is a linear or branched alkylene group, L' and L" are divalent groups, which may be identical or different, $X^1$ represents O, NH or S, n' is an integer ranging from 0 to 10, n" is an integer ranging from 1 to 50, m' is equal to 0 or 1, and m" is equal to 0 or 1.

4. The organosilane compound of claim 1, wherein R' is an acyl group or an alkyl group substituted with one or more functional groups and/or which comprises one or more double bonds.

5. The organosilane compound of claim 1, wherein the hydrophobic group is a fluorocarbon group.

6. The organosilane compound of claim 1, wherein the non-hydrolyzable group comprising a hydrophobic group having at least one fluorine atom is a fluorinated group of formula:

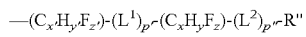

wherein R" is a hydrogen or fluorine atom, an acyl group or an alkyl group which is linear or branched, which can be substituted with one or more heteroatoms or functional groups, and which can additionally comprise one or more double bonds, $L^1$ and $L^2$ are divalent groups, which may be identical or different, x' is an integer ranging from 0 to 10, y' and z' are integers such that y'+z'=2x', x is an integer ranging from 1 to 40, y and z are integers such that y+z=2x, p' is equal to 0 or 1, and p" is equal to 0 or 1.

7. The organosilane compound of claim 1, further defined as having formula (I) or (II):

$$(G^1)(G^2)Si(X)_n(R^1)_{2-n} \qquad (I)$$

$$(G^1)(G^2)A\text{-}Si(X)_m(R^1)_{3-m} \qquad (II)$$

in which $G^1$ is a non-hydrolyzable group comprising a hydrophilic group, $G^2$ is a non-hydrolyzable group comprising a hydrophobic group having at least one fluorine atom, $R^1$ is a monovalent organic group bonded to the silicon by a carbon atom, the groups X, which may be identical or different, are hydrolyzable groups, A is a trivalent spacer group, n=1 or 2, m=1, 2 or 3.

8. The organosilane compound of claim 1, further defined as having any one of the following formulae:

(A1)

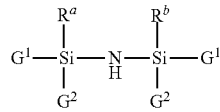

(B)

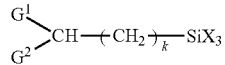

(C)

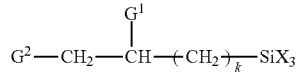

(D)

(E)

in which $G^1$ is a non-hydrolyzable group comprising a hydrophilic group, $G^2$ is a non-hydrolyzable group comprising a hydrophobic group having at least one fluorine atom, the groups X, which may be identical or different, are hydrolyzable groups, the $R^a$ and $R^b$ groups, which may be identical or different, are monovalent organic groups bonded to the silicon by a carbon atom, and k is an integer ranging from 0 to 10.

9. The organosilane compound of claim 1, further defined as having formula:

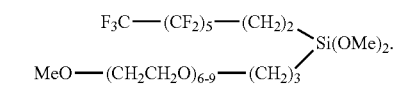

10. The organosilane compound of claim 1, further defined as having a molar weight ranging from 500 to 1500 g/mol.

11. An optical article having a substrate coated with a precursor coating for an anti-fog coating, wherein said precursor coating for an anti-fog coating is formed by depositing, at the surface of the optical article, at least one organosilane compound of claim 1.

12. The optical article of claim 11, wherein the precursor coating for the anti-fog coating has a static contact angle with water of greater than or equal to 50°.

13. The optical article of claim 11, wherein the precursor coating for the anti-fog coating is coated with a surfactant film.

14. The optical article of claim 11, further defined as an ophthalmic lens.

15. The optical article of claim 11, wherein the precursor coating for the anti-fog coating has a static contact angle with water of greater than or equal to 60°.

16. A process for preparing an optical article of claim 11, comprising:
 a) providing a substrate having at least one main surface,
 b) depositing, on said main surface of the substrate, at least one organosilane compound of claim 1, so as to obtain a precursor coating for an anti-fog coating.

17. The process of claim 16, wherein said organosilane compound is deposited by vacuum evaporation.

* * * * *

UNITED STATES PATENT AND TRADEMARK OFFICE
CERTIFICATE OF CORRECTION

| | |
|---|---|
| PATENT NO. | : 10,830,924 B2 |
| APPLICATION NO. | : 15/768156 |
| DATED | : November 10, 2020 |
| INVENTOR(S) | : Alexis Theoden and Mamonjy Cadet |

Page 1 of 1

It is certified that error appears in the above-identified patent and that said Letters Patent is hereby corrected as shown below:

Claim 4, Column 21, Line 24:
Delete "of claim 1" and replace with -- of claim 3 --.

Claim 11, Column 22, Line 41:
Delete "an anti-fog" and replace with -- the anti-fog --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*